June 23, 1936.  E. F. HUDDLE  2,045,144
GRAIN BINDER
Filed July 8, 1935
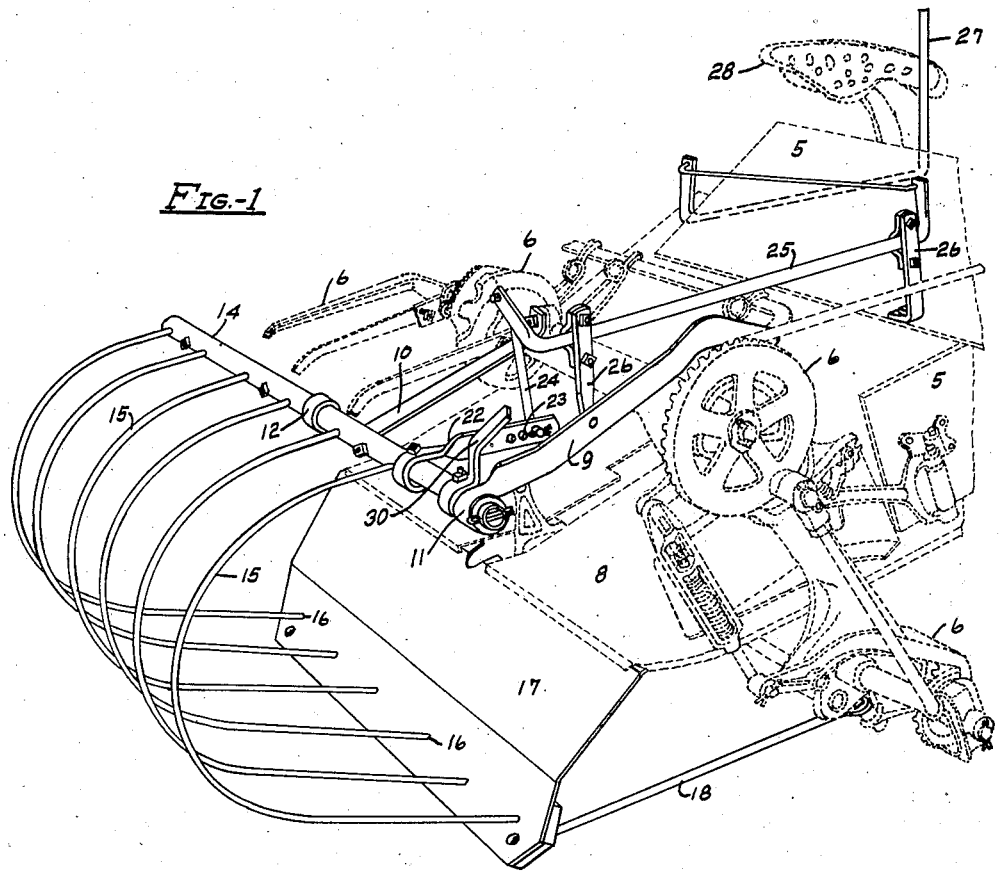
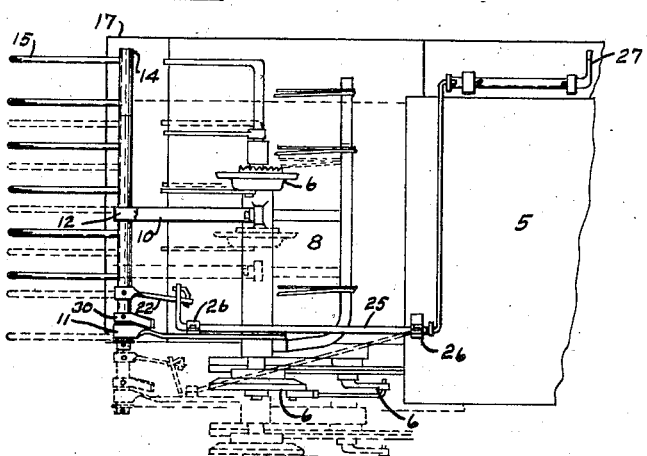
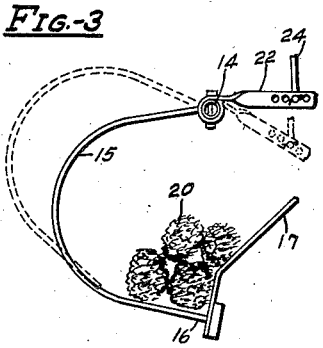
INVENTOR.
EDWIN F. HUDDLE
BY James A. Walsh
ATTORNEY Patented June 23, 1936

2,045,144

UNITED STATES PATENT OFFICE 2,045,144

GRAIN BINDER

Edwin F. Huddle, Rockford, Ill., assignor to J. I. Case Company, Racine, Wis., a corporation Application July 8, 1935, Serial No. 30,322

8 Claims. (Cl. 56—474)

My invention relates to improvements in grain binders, and particularly to means for handling bound flax, which commonly is delivered from the machine in loose condition and then piled, but for manufacturing products for especial purposes it is necessary to bind the flax in small sheaves of approximately six inches in diameter, and dump the sheaves usually in quantities of four from which a small shock is made. Because of their small dimensions it is not practical to utilize the conventional bundle carrier used in wheat and like grain fields for collecting and discharging such flax sheaves, and it is therefore my object to provide suitable means for the purpose, which I have demonstrated in practice to be highly efficient.

In the accompanying drawing, forming part hereof, Figure 1 is a fragmentary perspective view of a conventional binder including my improvement; Fig. 2, a plan view, the adjusted position of the movable parts of the deck and bundle forming mechanisms being indicated in dotted lines; and Fig. 3 is a view looking toward my improved bundle collector and discharger and the position of its tines in carrying and discharging action indicated respectively by full and dotted lines.

In said drawing the numeral 5 indicates a binder of any suitable construction including the usual binding, tying and knotting mechanisms, indicated in general at 6, and being no part of my present invention they are referred to but incidentally in describing the improvement.

Upon the frame of the binding mechanism 6 I secure anchors, as 9, 10, having bearings 11, 12, at their ends in which I mount a rock-shaft 14, which may be tubular in form, and to which I secure a series of tines 15 curved into substantially semi-circular form so that their lower free ends 16 turn toward and abut a wall or deflector 17 extending downwardly from the deck 8, and preferably braced by a rod 18, which assemblage of tines and wall constitute a receptacle into which bound flax sheaves 20 discharging from the binder-deck will be retained until released.

It will be understood, of course, that the binder when traveling through a field cuts and binds the flax into sheaves, which fall in transverse position into the receptacle described, and when sufficient sheaves have accumulated therein, as indicated by full lines in Fig. 3, it is necessary for my purpose to deposit them upon the ground to be then formed into a shock, which is accomplished by raising the tines to substantially the position shown by dotted lines in Fig. 3, so that the tines, being thus separated from the wall 17, provide ample space for the discharge of the sheaves. The tines are then returned to normal position for receiving another load of sheaves, and such adjusting operations as described are repeated as frequently as required. For such adjustments I may employ an arm 22 secured to rock-shaft 14, and which arm includes a series of perforations 23 in its end by which it may be adjustably secured to a link 24 attached to a rod 25 preferably supported by standards 26, and connected to a lever 27 within reach of an operator on seat 28, by which the arm 22 may be actuated to rock the shaft 14 to raise the tines 15 for releasing the sheaves and to control the descent of the tine assemblage when returning to sheave retaining position, the upward movement of the tines being limited by a stop 30 adapted to contact with anchor 9; but it will be understood that any suitable actuating device for the purpose may be employed.

It will be noted that my improved receptacle, including the wall 17, is so mounted as to move and cooperate with the binder-deck and tying mechanism when the latter are adjusted for different lengths of bundles as is common, and that in the manner disclosed I provide means for positively and instantly releasing the material during the dumping operations, which is of especial importance in handling flax the straws of which are of viscous character.

I claim as my invention:

1. In a binder for flax, the combination, with the deck thereof, of a substantially vertical wall, bundle forming means associated with the deck, a bundle container mounted on the latter means and having a substantially horizontal bundle retaining element upon which bundles may rest, and means for adjusting the container into bundle receiving and dumping positions in relation to the wall.

2. In a binder, the combination, with the deck thereof, of a substantially vertical wall extending from the deck, bundle forming means associated with the deck, a bundle container pivotally mounted on said means, and having a portion disposed transversely of the wall against which a bundle may rest, and means for adjusting the container in proximity to the wall for receiving and retaining bundles and for removing the container from the wall for dumping the bundles.

3. In a binder, the combination, with the deck thereof, of a downwardly directed wall, movable bundle forming means associated with the deck, a bundle container mounted on the forming means, movable therewith, and having a portion disposed substantially at right angles to the wall against which a bundle may rest, and means for adjusting the container into bundle receiving and dumping positions in relation to the wall.

4. In a binder, the combination, with the deck thereof, of binding mechanism, a bundle container including tines pivotally mounted on the binding mechanism, and having substantially horizontal portions upon which bundles may rest, and means for adjusting the container into bundle receiving and dumping positions.

5. In a binder for flax, the combination, with the deck thereof, of binding mechanism, a wall extending from the deck substantially vertically downward, a rock-shaft mounted on the binding mechanism, tines secured to the shaft and curved into substantially semi-circular form so that their ends contact with the wall substantially at right angles thereto and therewith form a bundle container, and lever mechanism associated with the shaft for adjusting the tines into bundle carrying and dumping positions.

6. In a binder, the combination, of a movable deck therefore, binding mechanism carried by said deck, a wall extending from the deck and movable therewith, a tine assemblage pivotally mounted on said mechanism, the free ends of the tine members being adapted to contact with the wall and shaped to provide portions on which a bundle may rest, said tine assemblage and wall being movable with the deck, and means for adjusting the tines into bundle carrying and dumping positions.

7. In a binder for flax, the combination, with the deck thereof, of binding mechanism, a wall extending substantially vertically downward from said deck, a rock shaft mounted on the binding mechanism, tines secured to the shaft and shaped to provide portions disposed substantially horizontally upon which finished bundles may rest adjacent said wall, and mechanism connected with said rock shaft for rocking it so as to remove said tine portions from beneath said bundles to cause them to drop along the face of said wall and to be discharged from the binder.

8. In a binder the combination of a movable deck, binding mechanism carried by said deck and movable therewith, a tine assemblage pivotally supported from said deck and movable therewith, a wall extending from said deck having a portion disposed substantially vertically downward, said tine assemblage being so shaped as to have portions adapted to contact the substantially vertical portion of said wall and on which a bundle formed by said binding mechanism may rest adjacent said wall, and mechanism connected with said tine assemblage and arranged for pivotally moving it so as to remove said tine assemblage portions from beneath said bundle to cause it to drop along the face of the wall to be discharged from the binder.

EDWIN F. HUDDLE.